(12) United States Patent
Yamamoto

(10) Patent No.: US 8,243,138 B2
(45) Date of Patent: Aug. 14, 2012

(54) DISPLAY SYSTEM FOR SHOOTING AND DISPLAYING IMAGE AROUND VEHICLE

(75) Inventor: Toshiaki Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 315 days.

(21) Appl. No.: 12/662,344

(22) Filed: Apr. 13, 2010

(65) Prior Publication Data

US 2010/0259615 A1    Oct. 14, 2010

(30) Foreign Application Priority Data

Apr. 14, 2009    (JP) .................................. 2009-97675

(51) Int. Cl.
*H04N 7/18*       (2006.01)
*H04N 13/00*      (2006.01)
*B60Q 1/00*       (2006.01)
(52) U.S. Cl. ........................... 348/148; 340/435; 348/43
(58) Field of Classification Search .................... 348/148
See application file for complete search history.

(56) References Cited

U.S. PATENT DOCUMENTS

| | | |
|---|---|---|
| 2006/0204037 A1 | 9/2006 | Watanabe et al. |
| 2008/0231702 A1 | 9/2008 | Matsumoto |
| 2008/0309763 A1 | 12/2008 | Hongo |
| 2009/0010630 A1 | 1/2009 | Higashibara et al. |

FOREIGN PATENT DOCUMENTS

| | | |
|---|---|---|
| JP | A-2007-228154 | 9/2007 |
| JP | A-2007-274564 | 10/2007 |
| JP | A-2008-269139 | 11/2008 |
| JP | A-2009-17169 | 1/2009 |
| JP | A-2009-267602 | 11/2009 |
| JP | A-2010-183265 | 8/2010 |
| WO | WO 2005/080120 | * 9/2005 |

* cited by examiner

*Primary Examiner* — Sath V Perungavoor
*Assistant Examiner* — Xiaolan Xu
(74) *Attorney, Agent, or Firm* — Posz Law Group, PLC

(57) ABSTRACT

An display system of an image around a vehicle includes: a shooting element; a controller including a processor and a memory; and a display device. The shooting element includes a bracket fixed to the vehicle, a camera in the bracket, a protrusion of the camera and a contact position sensor of the protrusion. The memory stores retrieved region information about a retrieved region defined by a display coordinate system and retrieved from the image. The display device displays the retrieved region. When the contact position of the protrusion is changed, the processor modifies the retrieved region information based on the contact positions before changing and after changing such that a region defined by a local coordinate system corresponding to the retrieved region after changing is equal to the region defined by the local coordinate system before changing.

4 Claims, 11 Drawing Sheets

DISPLAY SYSTEM FOR SHOOTING AND DISPLAYING IMAGE AROUND VEHICLE

CROSS REFERENCE TO RELATED APPLICATION

This application is based on Japanese Patent Application No. 2009-97675 filed on Apr. 14, 2009, the disclosure of which is incorporated herein by reference.

FIELD OF THE INVENTION

The present invention, relates to a display system for shooting and displaying an image around a vehicle.

BACKGROUND OF THE INVENTION

Conventionally, a camera is mounted on a vehicle, and the camera shoots an image around the vehicle. Thus, a part of the image is retrieved, i.e., extracted or cut off, and the part of the image is displayed on a display. Thus, a passenger of the vehicle recognizes the image around the vehicle. This display system for shooting an image around the vehicle is disclosed in, for example, JP-A-2008-230476, which corresponds to US Patent Application Publication No. 2008-0231702.

In the above system, the part of the image, which is retrieved from the original image, is defined as an extracted image. A range of the extracted image in the original image is defined by local coordinate system, which are fixed to the vehicle. Specifically, the range in the original image corresponds to a predetermined part of the vehicle. Thus, the part of the original image is retrieved from the original image, and the part of the original image is displayed as a predetermined region defined by the local coordinate system fixed to the vehicle. Thus, when the camera is mounted on the vehicle, the position and the orientation of the camera are adjusted to be a predetermined position and a predetermined orientation. Under a condition that the camera is adjusted to be a predetermined position and a predetermined orientation with respect to the vehicle, when the display system for shooting and displaying the image around the vehicle is manufactured, retrieved region information showing a retrieved range of the original image, which is defined by display coordinate system fixed to the original image, is preliminary set.

However, the actual position and the actual orientation of the camera may be different from a predetermined position and a predetermined orientation. Since the predetermined retrieved range information is preliminary determined under a condition that the camera is adjusted to be a predetermined position and a predetermined orientation, when the part of the original image is retrieved from the original image according to the predetermined retrieved range information, the region defined by the local coordinate system, which is actually displayed as the retrieved image, may be different from the proper region to be displayed. Specifically, the actual display region may shift from the proper region.

To reduce the shift between the actual display region and the proper region, the vehicle is places to certain environment, which provides to arrange a marker such as a LED at a certain position. Then, the original image is shot by the camera of the system in the vehicle, and the mismatch between the actual display coordinate system of the marker in the shot image and the proper display coordinate system of the marker in the proper image is calculated. Based on the calculated mismatch, the actual display coordinate system is corrected to modify the actual retrieved range of the original image. However, in this case, it is necessary to place the vehicle in the certain environment. Thus, this modification can be performed before the vehicle is shipped.

SUMMARY OF THE INVENTION

In view of the above-described problem, it is an object of the present disclosure to provide a display system for shooting and displaying an image around a vehicle. Even if a position and/or an orientation of a camera in the system shift from a predetermined position and/or a predetermined orientation when a user utilizes the vehicle after the vehicle is shipped, a retrieved range defined by display coordinate system is corrected easily.

According to an aspect of the present disclosure, an display system for shooting and displaying an image around a vehicle includes: a shooting element mounted on the vehicle; a controller including a camera port, a position sensor port, a processor and a memory; and a display device. The shooting element includes a bracket, a camera, a protrusion and a contact position sensor. The bracket is fixed to the vehicle. The camera is accommodated in the bracket, and shoots an image around the vehicle. The protrusion is mounted on the camera. The contact position sensor mounted on the bracket, and detects a contact position of the protrusion. The camera includes an output terminal for outputting an image signal. The output terminal of the camera is coupled with the camera port via a cable. The contact position sensor includes an output terminal for outputting a detection result signal. The output terminal of the contact position sensor is coupled with the position sensor port via a cable. The memory stores retrieved region information, which is defined by a display coordinate system, and provides information of a retrieved region, which is retrieved from the image. The display coordinate system is fixed to the image. The processor retrieves the retrieved region defined by the display coordinate system from the image according to the retrieved region information. The processor controls the display device to display the retrieved region. When the contact position of the protrusion is changed, the processor modifies the retrieved region information based on the contact position before changing and the contact position after changing in such a manner that a region defined by a local coordinate system corresponding to the retrieved region defined by the display coordinate system after changing is equal to the region defined by the local coordinate system before changing. The local coordinate system is fixed to the vehicle.

In the above system, the processor modifies the retrieved region of the image with using the contact position of the protrusion before the camera shifts and the contact position of the protrusion after the camera shifts. Accordingly, even if a position and/or a orientation of the camera with respect to the bracket are changed after the shooting element is replaced with a new one, or even if the position and/or the orientation of the camera with respect to the bracket are changed when external force is applied to the shooting element, the system modifies the retrieved region defined in the display coordinate system according to the change of the position and/or the orientation of the camera. It is not necessary to place the vehicle with the system in special environment for modifying the retrieved region.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

A display system for shooting and displaying an image around a vehicle according to an example embodiment is mounted on the vehicle. The system includes multiple cameras, each of which shoots an image around the vehicle. The system retrieves a part of a shot image of each camera, and combines the retrieved images so that a bird eye view image is displayed for a passenger of the vehicle.

Figure 1:
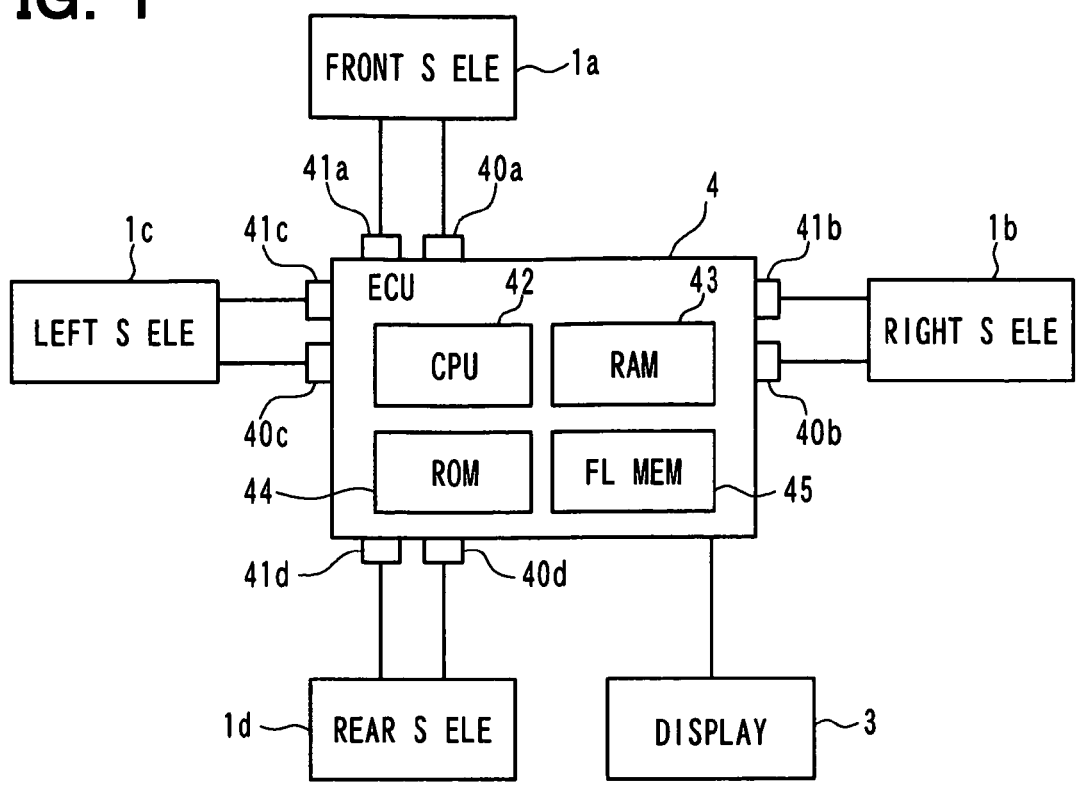
FIG. 1 is a block diagram showing a display system for shooting and displaying an image around a vehicle according to an example embodiment.

The system includes a front image shooting element $1a$, a right side image shooting element $1b$, a left side image shooting element $1c$, a rear image shooting element $1d$, an image display device 3 and a ECU 4, as shown in FIG. 1.

Figure 2:
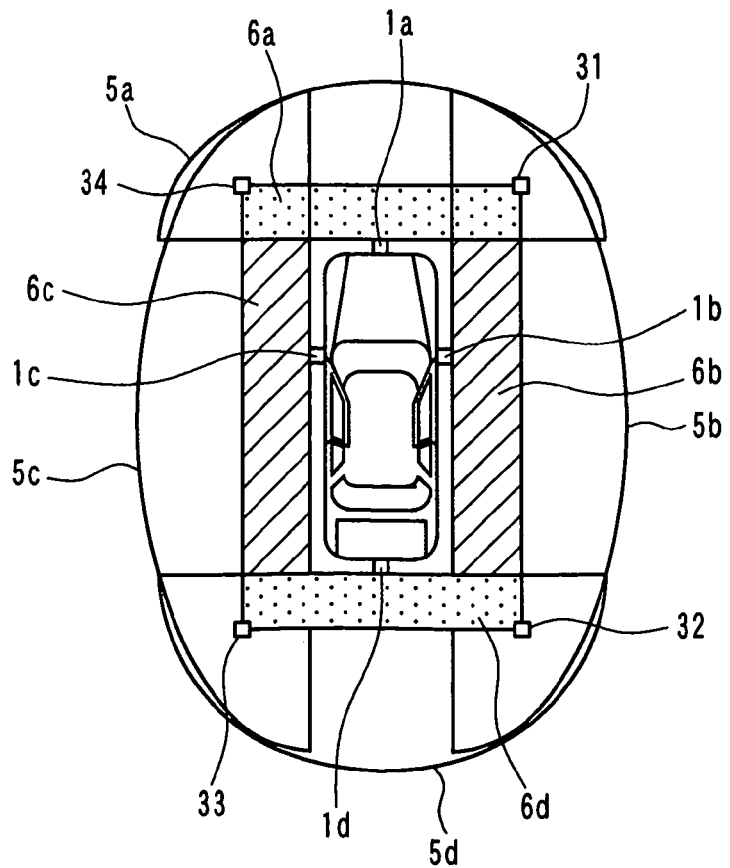
FIG. 2 is a diagram showing a position of a shooting element, a shooting range and a display range of the system.
Figure 3:
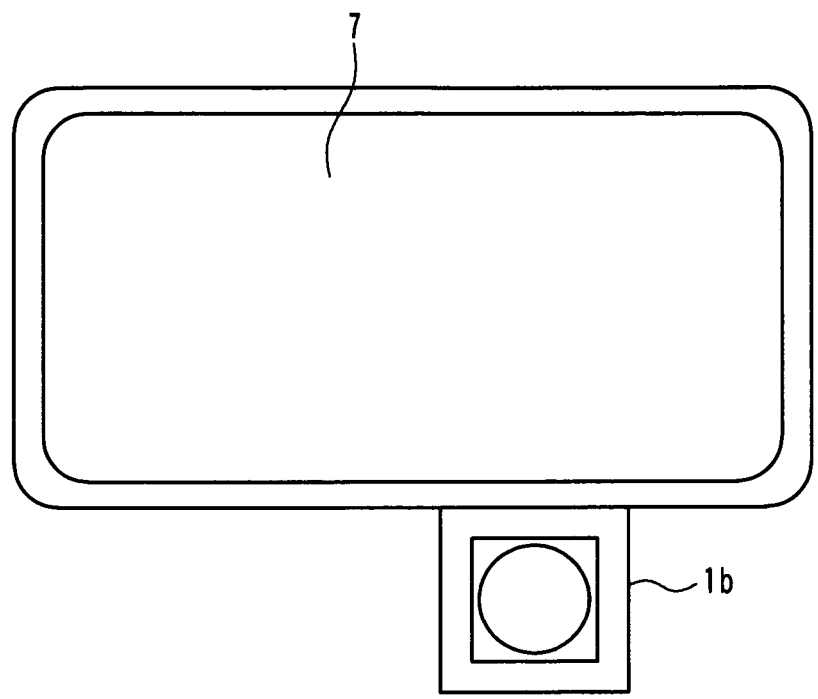
FIG. 3 is a diagram showing a position of a right side shooting element.

The front image shooting element $1a$, the right side image shooting element $1b$, the left side image shooting element $1c$, and the rear image shooting element $1d$ shoot an image of a front image, a right side image, a left side image and a rear image of the vehicle, respectively. Each element $1a$-$1d$ outputs the shot image to the ECU 4. As shown in FIG. 2, the front image shooting element $1a$ is attached to a front of the vehicle, the rear image shooting element $1d$ is attached to a rear of the vehicle, the right side image shooting element $1b$ is attached to a right side of the vehicle, and the left side image shooting element $1c$ is attached to a left side of the vehicle. For example, as shown in FIG. 3, the right side image shooting element $1b$ may be arranged on a lower end of a right side mirror 7.

Each element $1a$-$1d$ shoots an image around the vehicle such as a ground with a wide angle from an attached position. A shooting range of each element $1a$-$1d$ is shown as an area surrounded with a solid line $5a$-$5d$ in FIG. 2.

The system actually displays an image of a front rectangular region $6a$ in the shooting range $5a$ of the front image shooting element $1a$, an image of a right side rectangular region $6b$ in the shooting range $5b$ of the right side image shooting element $1b$, an image of a left side rectangular region $6c$ in the shooting range $5c$ of the left side image shooting element $1c$, and an image of a rear rectangular region $6d$ in the shooting range $5d$ of the right side image shooting element $1d$. Specifically, the images of the rectangular regions $6a$-$6d$ are retrieved from the shot images in the shooting ranges $5a$-$5d$, respectively, and then, the system displays the images of the rectangular regions $6a$-$6d$. In the present embodiment, the rectangular regions $6a$-$6d$ as retrieved regions $6a$-$6d$ are easily corrected even after the system is shipped.

A common feature of the elements $1a$-$1d$ will be explained. Here, the elements $1a$-$1d$ are simply defined as a shooting element 1.

Figure 4:
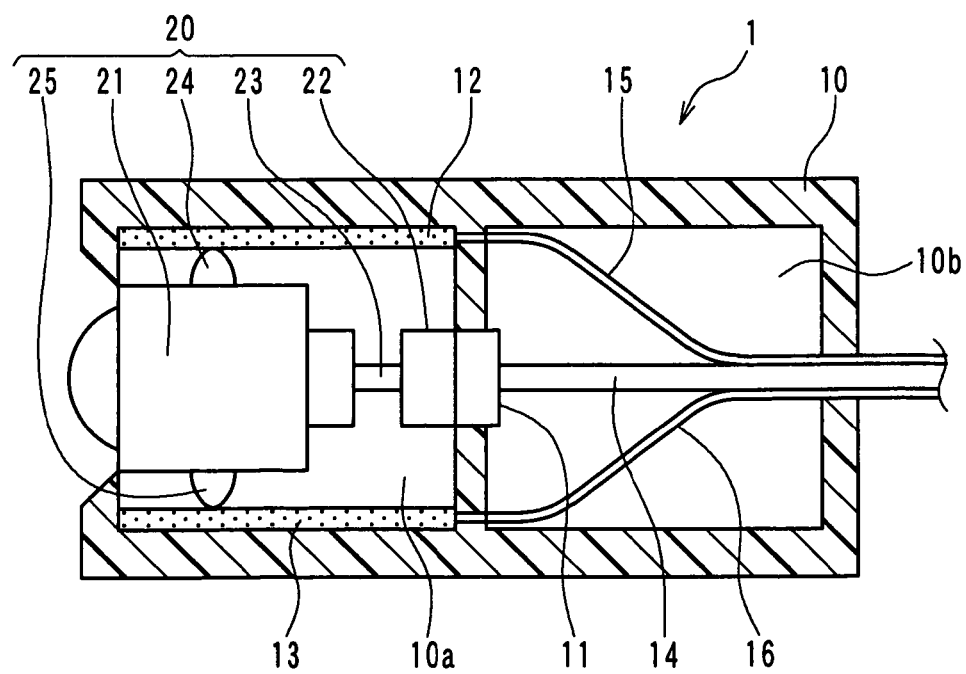
FIG. 4 is a diagram showing a construction of the shooting element.

As shown in FIG. 4, the shooting element 1 includes a bracket 10 as a casing 10, a bracket side connector 11, an upper side contact position sensor 12, a lower side contact position sensor 13, cables 14-16 and a camera unit 20.

The bracket 10 is made of resin, for example. The shooting element 1 is fixed to the vehicle via the bracket 10. Further, the bracket 10 protects other parts of the shooting element 1 from external objects. When the shooting element 1 is mounted on the vehicle, the bracket 10 is fixed to the vehicle with a screw or the like. The inside of the bracket 10 is divided into a camera accommodation room $10a$ and a cable room $10b$ by a partition. The camera accommodation room $10a$ accommodates the camera unit 20. The cable room $10b$ accommodates the cables 14-16.

The bracket side connector 11 is fixed to the partition for partitioning the camera accommodation room $10a$ and the cable room $10b$. In the cable room $10b$, the bracket side connector 11 is coupled with the cable 14. The cable 14 is a wire for outputting an image signal from the camera unit 20 to the ECU 4.

The upper side contact position sensor 12 as a first contact position sensor detects a contact position of the sensor 12 itself when an object contacts the sensor 12. The sensor 12 is a conventional resistor film type sensor, and has a rectangular plate shape. In the camera accommodation room $10a$, the sensor 12 is bonded to an upper wall of the inner wall of the bracket 10. The information of the detected contact position is output to the ECU 4 via the cable 15, which is coupled with the sensor 12.

The lower contact position sensor 13 as a second contact position sensor detects a contact position of the sensor 13 itself when an object contacts the sensor 13. The sensor 13 is a conventional resistor film type sensor, and has a rectangular plate shape. In the camera accommodation room $10a$, the sensor 13 is bonded to a lower wall of the inner wall of the bracket 10. The sensor 13 is arranged to be in parallel to the sensor 12. The information of the detected contact position is output to the ECU 4 via the cable 16, which is coupled with the sensor 13.

The camera unit 20 is accommodated in the camera accommodation room 10a. The camera unit 20 includes a camera 21, a camera side connector 22, a connection cable 23, an upper side protrusion 24 and a lower side protrusion 25.

The camera 21 includes optical parts such as a wide angle lens and a CCD so that the camera 21 shoots an image around the vehicle with a wide angle. The camera side connector 22 is coupled with the camera 21 via the connection cable 23. The camera side connector 22 is also coupled with the bracket side connector 11.

The shot image by the camera 21 is output to the ECU 4 via the connection cable 23, the camera side connector 22, the bracket side connector 11 and the cable 14.

The upper side protrusion 24 as a first protrusion fixed to the camera 21 is integrated with the camera 21 so that the protrusion 24 protrudes from the camera 21 upwardly. A top of the protrusion 24 contacts a point of the upper contact position sensor 12 so that the protrusion 24 presses the sensor 12.

The lower side protrusion 25 as a second protrusion fixed to the camera 21 is integrated with the camera 21 so that the protrusion 25 protrudes from the camera downwardly. A top of the protrusion 25 contacts a point of the lower contact position sensor 13 so that the protrusion 25 presses the sensor 13. Thus, the upper side protrusion 24 and the lower side protrusion 25 protrude from the camera 21 toward opposite directions.

Since the shooting element 1 has the above structure, when the attachment position and/or the orientation of the camera unit 20 in the camera accommodation room 10a are changed, the contact position of the upper side protrusion 24 on the upper contact position sensor 12 and the contact position of the lower side protrusion 25 on the lower contact position sensor 13 are changed. Accordingly, the upper contact position sensor 12 and the lower contact position sensor 13 detect the attachment position and the orientation of the camera 21 with respect to the bracket 10. The bracket 10 is fixed to the vehicle with a predetermined position and a predetermined orientation. The upper contact position sensor 12 and the lower contact position sensor 13 substantially detect the attachment position and the orientation of the camera 21 with respect to the vehicle.

The image display device 3 displays the shot image based on image data received from the ECU 4. Thus, a passenger of the vehicle recognizes the image.

The ECU 4 is a controller including a CPU 42 as a calculation circuit, a RAM 43, a ROM 44 and a flash memory 45 as a non-volatile memory medium, which is rewritable.

The ECU 4 includes eight input and output ports 40a-40d, 41a-41d, which include I/O ports 40a-40d for the camera 21 and I/O ports 41a-41d for the position sensors 12, 13. The shot image output from the camera in each shooting element 1a-1d is input into a corresponding I/O port 40a-40d for the camera 21. Specifically, a terminal of the camera 21 in each shooting element 1a-1d, from which the shot image is output, is coupled with the corresponding I/O port 40a-40d for the camera 21 via the connection cable 23, the camera side connector 22, the bracket side connector 11 and the cable 14.

A detection signal output from the upper side contact position sensor 12 and/or the lower side contact position sensor 13 in each shooting element 1a-1d is input into a corresponding I/O port 41a-41d for the position sensors 12, 13. Specifically, terminals of the upper side contact position sensor 12 and/or the lower side contact position sensor 13 in each shooting element 1a-1d, from which the detection result signal is output, are coupled with the corresponding I/O port 41a-41d for the position sensors 12, 13 via the cables 15, 16.

The CPU 42 executes a program stored in the ROM 43 or the flash memory 45. Data is recorded in the RAM 44 and/or the flash memory 45 if necessary. Further, if necessary, data is read out from the ROM 43, the RAM 44 and/or the flash memory 45. IF necessary, data is obtained from the I/O port 41a-41d for the position sensors 12, 13 and the I/O port 40a-40d for the camera 21. Further, if necessary, an image is displayed on the image display device 3.

Specifically, when the CPU 42 executes the program, the ECU 4 performs a bird eye view image display process, a calibration process before shipping, a calibration modification process or the like.

In the bird eye view image display process, the shot image output from each shooting element 1a-1d is obtained via the I/O port 40a-40d for the camera 21, and then, the obtained shot image is processed so that the bird eye view image is generated. The bird eye view image is an oblique image of the vehicle and a surrounding area of the vehicle from above the vehicle. In the process, the generated bird eye view image is displayed on the display device 3.

Specifically, the ECU 4 retrieves a part of the shot image via each of the I/O port 40a-40d for the camera 21, the part corresponding to the rectangular region 6a-6d. The shot images are obtained at the same time. The retrieved parts of the shot images are processed by a conventional bird eye view conversion method. Then, the retrieved parts are arranged at predetermined positions so that the retrieved parts are combined. Thus, the bird eye view image is generated. Here, an object in the shot image is treated as an obstacle disposed on a ground surface.

Here, a method for retrieving the images of the rectangular regions 6a-6d from the shot images of the shooting ranges 5a-5d will be explained as follows. The local coordinate system, the camera coordinate system and the display coordinate system will be explained with reference to FIGS. 5 and 6.

Figure 5:
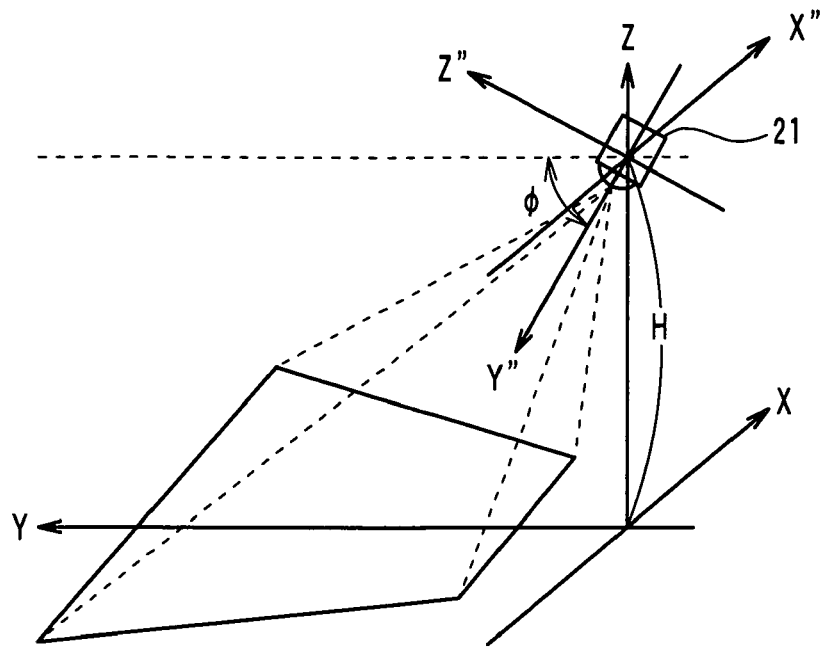
FIG. 5 is a diagram showing a relationship between local coordinate system and camera coordinate system.
Figure 6:
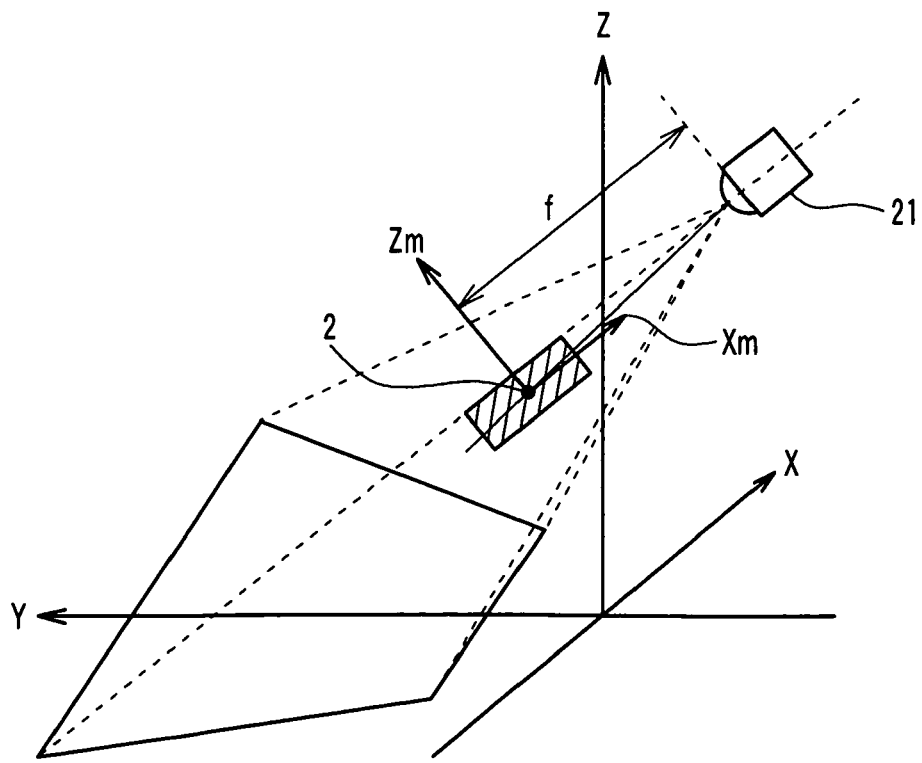
FIG. 6 is a diagram showing display coordinate system.
Figure 7:
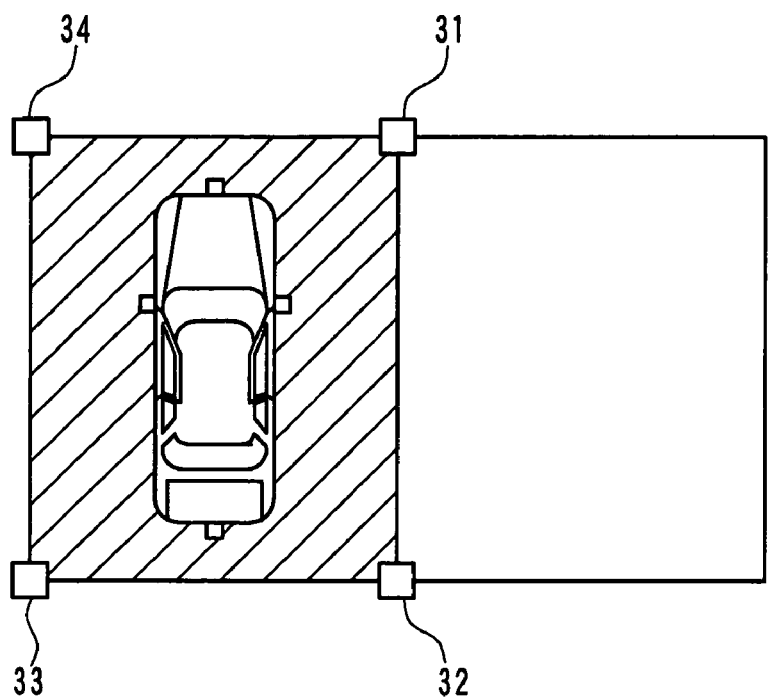
FIG. 7 is a diagram showing a position of a marker in a bird eye view image.

The local coordinate system is three-dimensional orthogonal coordinate system fixed to the vehicle. The local coordinate system is prepared in each of the shooting element 1a-1d. In FIGS. 5 and 6, the local coordinate system is defined by the X-axis, the Y-axis and the Z-axis. Specifically, the Z-axis is in parallel to the up-down direction of the vehicle, i.e., the vertical direction of the vehicle. The Z-axis is directed upward. Here, the up-down direction, the upward direction and the down ward direction are fixed to the vehicle. When the vehicle is disposed on a horizontal plane, the up-down direction coincides with the vertical direction, the upward direction coincides with the upward direction of the vertical direction, and the downward direction coincides with the downward direction of the vertical direction.

The original point of the local coordinate system is disposed at an intersection between a line extending from a center of the camera 21 along with the downward direction and the ground surface. The ground surface coincides with a flat plane when the vehicle is disposed on the flat plane.

The camera coordinate system is three-dimensional orthogonal coordinate system fixed to the camera 21. The camera coordinate system is prepared in each of the shooting element 1a-1d. In FIG. 5, the camera coordinate system are defined by the X"-axis, the Y"-axis and the Z"-axis. Specifically, a visual line of the camera 21 corresponds to the Y"-axis. Thus, the Y"-axis coincides with an optical axis of the camera 21. The Y"-axis is directed to a shooting object from the camera 21. The Z"-axis is in parallel to the up-down direction of the camera 21. The Z"-axis is directed to the upward direction of the camera 21. The up-down direction of the camera 21 is in parallel to a straight line passing through the upper side protrusion 24 and the lower side protrusion 25. The upward direction of the camera 21 is a direction from the lower side protrusion 25 to the upper side protrusion 24.

The original point of the camera coordinate system is disposed at a weight center of the camera 21. Accordingly, when the height of the weight center, i.e., the gravity center of the camera 21 from the ground surface is defined as H, the original point of the camera coordinate system is defined by the local coordinate system as follows.

$$(X, Y, Z) = (0, 0, H)$$

The X-axis of the local coordinate system is in parallel to the X"-axis of the camera coordinate system.

Regarding the camera coordinate system and the local coordinate system, a relationship between camera coordinates (X", Y", Z") defined by the camera coordinate system and local coordinates (X, Y, Z) defined by the local coordinates is defined as follows.

$$\begin{bmatrix} X'' \\ Y'' \\ Z'' \end{bmatrix} = \begin{bmatrix} 1 & 0 & 0 \\ 0 & \cos\phi & -\sin\phi \\ 0 & \sin\phi & \cos\phi \end{bmatrix} \begin{bmatrix} X \\ Y \\ Z - H \end{bmatrix} \quad (F1)$$

Here, the angle $\phi$ is defined by an angle of the Y"-axis with respect to the Y-axis. Thus, the angle $\phi$ is a depression angle of the camera 21.

Next, the display coordinate system will be explained. The display coordinate system is prepared in each shooting element 1a-1d. As shown in FIG. 6, the display coordinate system is a two-dimensional orthogonal coordinate system fixed to the camera 21. The display coordinate system includes a Xm-axis and a Zm-axis, which shows a position of an image on a plane, the image being focused around a visual point 2 of the camera 21. The display coordinate system is substantially fixed to the shot image.

A relationship between the camera coordinates (X", Y", Z") defined by the camera coordinate system and the display coordinates (Xm, Zm) defined by the display coordinate system is shown as follows. Here, a certain point is defined by the camera coordinates (X", Y", Z"), and the certain point is focused at a position defined by the display coordinates (Xm, Zm) with using a lens of the camera 21.

$$\begin{bmatrix} Xm \\ Zm \end{bmatrix} = \begin{bmatrix} \dfrac{f}{Y''} \times X'' \\ \dfrac{f}{Y''} \times Z'' \end{bmatrix} \quad (F2)$$

Here, the factor f is a distance between the visual point 2 and a principal point of the lens of the camera 21. Specifically, the factor f is a focal distance of the camera 21.

Since the local coordinate system, the camera coordinate system and the display coordinate system have the above relationship, a position in the shot image corresponding to a certain position on the ground surface is uniquely determined. Specifically, when the local coordinates of a certain point on the ground surface is defined as (X, Y, Z)=(X1, Y2, 0), these coordinates are substituted into the equation F1, so that the camera coordinates of the certain point is calculated. Further, the calculated camera coordinates are substituted into the equation F2, so that the display coordinates of the certain point are calculated.

When the images of the rectangular regions 6a-6d are retrieved from the shot images of the shooting elements 1a-1d, the ECU 4 obtains the retrieved region information from the flash memory 45. The ECU 4 retrieves the images of the rectangular regions 6a-6d according to the retrieved region information.

The retrieved region information is prepared for each shooting element 1a-1d. The information shows the display coordinates of the retrieved region 6a-6d in the shooting range 5a-5d of each shooting element 1a-1d. Thus, the retrieved region information of each shooting element 1a-1d shows the retrieved region 6a-6d defined by the display coordinates fixed to the shot image and retrieved from the shot image of the shooting element 1a-1d.

The retrieved region information of one of the shooting ranges 5a-5d in one of the shooting elements 1a-1d may include the display coordinates of four corners of the rectangular shaped retrieved region 6a-6d. Alternatively, the retrieved region information may include an equation of a boundary of the retrieved region 6a-6d defined by the display coordinates. Alternatively, the information may include an inequality defined by the display coordinates and showing an inside of the retrieved region 6a-6d.

A calibration process will be explained. In the above bird eye view image display process, the information about the orientation of the camera 21 with respect to the vehicle, i.e., the information of the angle $\phi$ of the camera 21 is utilized in a bird eye view conversion step. The orientation of the camera 21 is adjusted to be a predetermined orientation when the camera 21 is mounted on the vehicle.

However, actually, variation of the orientation of the camera 21 from vehicle to vehicle may be generated according to variation of an attachment position of the camera 21 with respect to the bracket 10, variation of a fixation position of the bracket 10 with respect to the vehicle and the like. Initial retrieved region information, which is set at a time when the display system is manufactured, is determined under a condition that the camera 21 is directed to a predetermined orientation. Thus, when a part of the original image is cut off according to the initial retrieved region information, the local coordinates of the retrieved region, which is shown as the retrieved image, may be different from the local coordinates of the proper retrieved region, which is shown as the proper retrieved image.

The ECU 4 executes the calibration process when the system is shipped so that the deviation between the local coordinates of the actual retrieved region and the local coordinates of the proper retrieved region is reduced.

The ECU 4 starts to execute the calibration process when a power source of the display system turns on after the system is shipped. Alternatively, the ECU 4 may start to execute the calibration process according to a predetermined operation of an input device as a calibration setting means such as a switch by an operator.

The operator turns on the display system for the first time when the vehicle is arranged at a predetermined position in an equipment for calibration, and then the vehicle is shipped.

As shown in FIG. 2, multiple marker objects 31-34 are arranged in the equipment. The marker objects 31-34 are arranged at four corners of an outer periphery of the retrieved regions 6a-6d. Each object 31-34 is, for example, LEDs or a plate having a predetermined shape.

Figure 8:
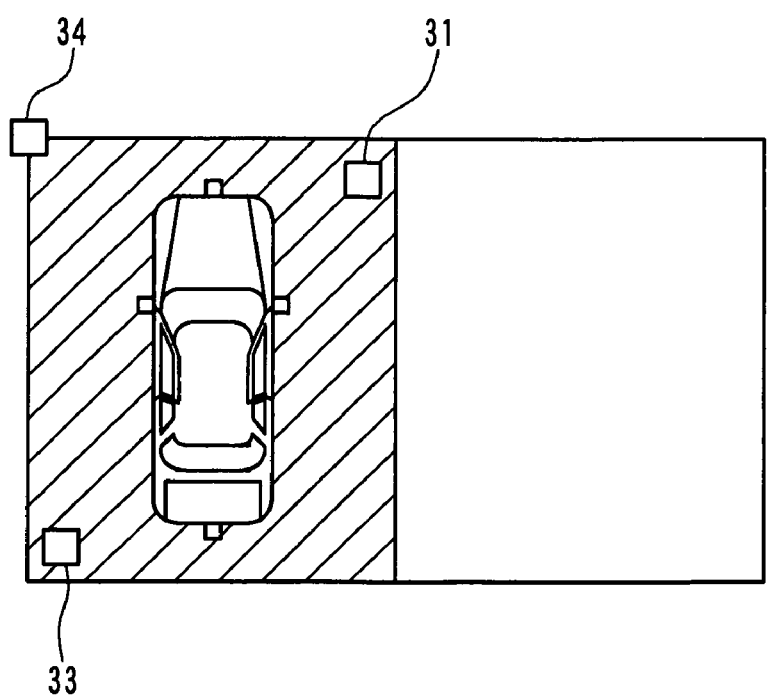
FIG. 8 is a diagram showing a position of a marker in another bird eye view image.

A position of each object 31-34 is determined by the following method. When the camera 21 of each shooting element 1a-1d is directed to the predetermined direction correctly, the marker objects 31-34 are positioned at four corners of the bird eye view image on the display screen of the display device 3 in the bird eye view image display process. Accordingly, as shown in FIG. 8, when at least one of the marker objects 31-34 is not disposed at a corresponding corner of the bird eye view image on the display screen of the display device 3 in the bird eye view image display process, at least one of the cameras 21 of the shooting elements 1a-1d is not directed to the predetermined direction correctly.

After the vehicle is arranged at a predetermined position, the operator turns on the power source of the display system. Thus, the ECU 4 starts to execute the calibration process. The ECU 4 executes the calibration process shown in FIG. 9 once for each shooting, element 1a-1d.

In the calibration process for one of the shooting elements 1a-1d, in step S110, assuming that the camera 21 of the one of the shooting elements 1a-1d is correctly directed to the predetermined direction, for example, assuming that the depression angle $\phi$ of the camera 21 is zero, the display coordinates of each of the marker objects 31-34 are calculated. Here, these calculated display coordinates are defined as predicted values. The marker objects 31-34 as a calculation object for the predicted values are disposed in a shooting range of the camera 21 of the one of the shooting elements 1a-1d. For example, when the camera 21 of the shooting element 1a is calibrated, the display coordinates of the marker objects 31, 34 are calculated.

Specifically, the local coordinates of the marker object 31-34 as the calibration object in the local coordinate system corresponding to the one of the shooting elements 1a-1d is input into the equations No. F1 and No. F2 so that the display coordinates of the marker object 31-34 is obtained and defined as the predicted values.

The local coordinates of the marker object 31-34 in the local coordinate system corresponding to the one of the shooting elements 1a-1d may be preliminary stored in the ROM of the ECU 4. Alternatively, the local coordinates of the marker object 31-34 may be input into the ECU 4 by input operation of the operator when the calibration process is executed.

In step S120, the shooting image is obtained from the camera 21 of the one of the shooting elements 1a-1d. Then, in step S125, the marker object 31-34 as the calibration object in the shot image is specified in a conventional image recognition process. Thus, the display coordinates of the specified marker object 31-34 is calculated. Here, these display coordinates of the specified marker object 31-34 are defined as practical values.

In step S130, the ECU 4 determines whether the practical display coordinates coincide with the predicted display coordinates. When the practical display coordinates coincide with the predicted display coordinates, it goes to step S170. When the practical display coordinates do not coincide with the predicted display coordinates, it goes to step S140.

In step S140, based on the deviation between the practical display coordinates and the predicted display coordinates, the deviation between the actual depression angle $\phi 1$ and the predetermined depression angle $\phi 0$ of the camera 21 is calculated. Based on the deviation between the actual depression angle $\phi 1$ and the predetermined depression angle $\phi 0$, the actual depression angle $\phi 1$ is calculated. A method of calculating the deviation of the depression angle based on the deviation between the practical display coordinates and the predicted display coordinates may be performed with using the equations No. F1 and No. F2. Alternatively, information about a relationship between the deviation of the depression angle and the deviation of the practical display coordinates and the predicted display coordinates may be preliminary stored in the ROM of the ECU 4. The information of the relationship such as a correspondence table between the deviation of the depression angle and the deviation of the practical display coordinates and the predicted display coordinates may be used for calculating the deviation of the depression angle. Specifically, the deviation of the practical display coordinates and the predicted display coordinates is applied to the correspondence table so that the deviation of the depression angle is obtained.

Here, in the present embodiment, only the depression angle of the camera 21 is specified. Actually, there is possibility that deviations other than the depression angle $\phi$ may exist. However, in the present embodiment, the other deviations are presumed to be zero.

In step S150, the retrieved region 6a-6d corresponding to the actual depression angle $\phi 1$ calculated in step S140 is calculated. The retrieved region corresponding to the actual depression angle $\phi 1$ is defined by the display coordinate system so as to retrieve the region defined by the local coordinate system from the shot image of the camera 21 having the depression angle $\phi 1$. The retrieved region information for each shooting element 1a-1d defined by the local coordinate system such as the coordinates of four corners of the rectangular shaped retrieved region 6a-6d, the equation of the boundary of the retrieved region 6a-6d and the inequality showing the inside of the retrieved region 6a-6d is preliminary stored in the ROM of the ECU 4.

The retrieved region is calculated such that the information of the region of the shooting element 1 defined by the local coordinate system is converted to the information of the region defined by the camera coordinate system with using the equation No. 1. Then, the information of the region defined by the camera coordinate system after conversion is converted to the information of the region defined by the display coordinate system with using the equation No. 2. The information of the region defined by the display coordinate system shows the retrieved region 6a-6d.

In step S160, the actual depression angle $\phi 1$ calculated in step S140 is stored in the flash memory 45. The ECU 4 overwrites the retrieved region information currently stored in the flash memory 45 with the information of the retrieved region 6a-6d calculated in step S150. Then, it goes to step S170.

In step S170, the attachment status of the camera 21 is determined or specified based on the detection result signal output from the upper side contact position sensor 12 and the lower side contact position sensor 13 and obtained through the I/O port 41a-41d. The data of the attachment status of the camera 21 stored as an initial value T0 of the attachment status. Then, the process in FIG. 9 with respect to the camera 21 ends.

Here, the data of the attachment status of the camera 21 will be explained as follows. The data shows the contact positions of the upper side protrusion 24 and the lower side protrusion 25. The data is output from the upper side contact position sensor 12 and the lower side contact position sensor 13.

Figure 10:
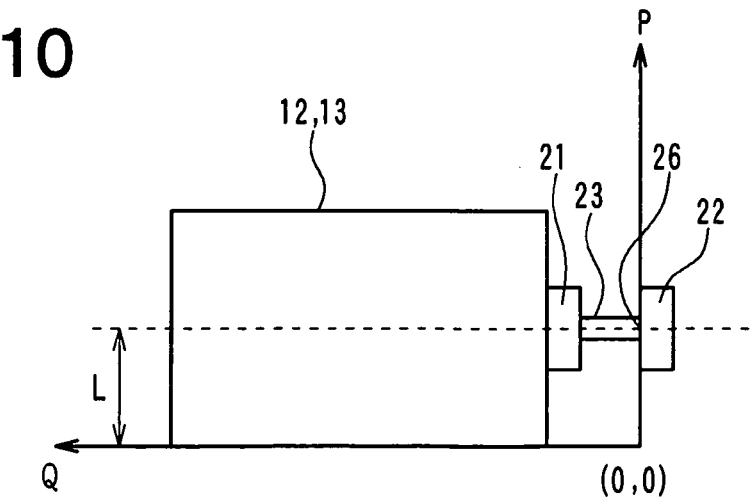
FIG. 10 is a diagram showing detection surface coordinate system.

Specifically, as shown in FIG. 10, a detection surface coordinate system (P, Q) is introduced as a two-dimensional orthogonal coordinate system along with the detection surface of the upper side contact position sensor 12, on which the upper side protrusion 24 contacts, and/or the detection surface of the lower side contact position sensor 13, on which the lower side protrusion 23 contacts. In the detection surface coordinate system, the P-axis coincides with the X"-axis defined by the camera coordinates in a case where the camera 21 is directed to the proper direction accurately. The Q-axis coincides with the Y"-axis defined by the camera coordinates in a case where the camera 21 is directed to the proper direction accurately. Here, the Y"-axis is the optical axis of the camera 21. The detection surface coordinates of a point, which is prepared by projecting a connection point 26 between the connection cable 23 and the camera side connector 22 on the detection surface vertically, is defined as (P, Q)=(L, 0). The connection point 26 is a fixation point. The detection surface of the upper side contact position sensor 12 or the detection surface of the lower side contact position sensor 13 is disposed in a range between 0 and 2xL. Thus, the detection surface of the upper or lower side contact position sensor 12, 13 is disposed in a range of $0 \leq P \leq 2L$.

The data of the attachment status of the camera 21 includes the detection surface coordinates (P, Q) of the contact point on the detection surface of the upper side contact position sensor 12 and the detection surface coordinates (P, Q) of the contact point on the detection surface of the lower side contact position sensor 13.

The data of the attachment status of the camera 21 shows a position and an orientation of the camera 21 with respect to the bracket 10. When the position and the orientation of the bracket 10 is not changed with respect to the vehicle, both of or one of the position and the orientation are changed with respect to the vehicle if the data of the attachment, status is changed.

Figure 11:
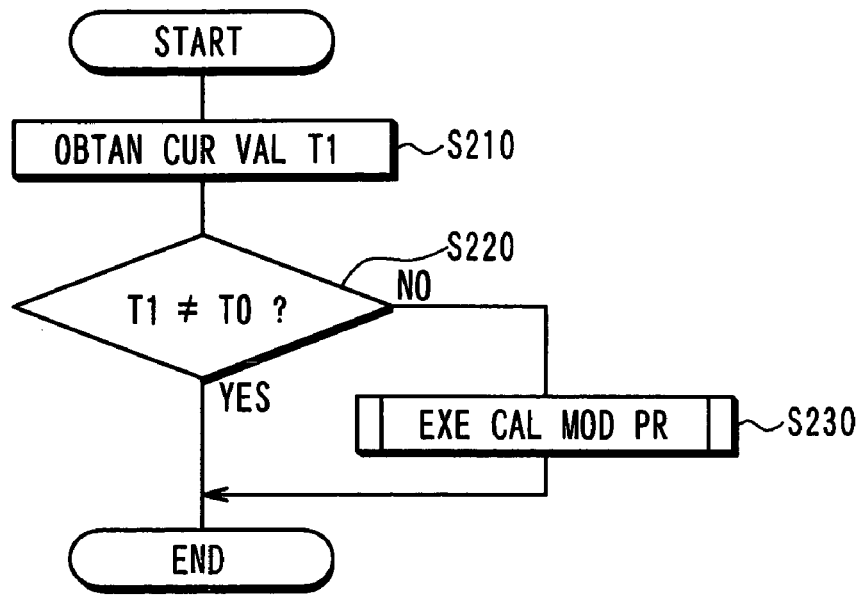
FIG. 11 is a flowchart showing a process after a system power source turns on when a use uses the system after the system is shipped.

Next, the operation of the ECU 4 will be explained when the user utilizes the system after the system is shipped. When the user utilizes the system, the ECU 4 is activated every time at which the vehicle starts and the power source of the display system turns on. Then, the process in FIG. 11 is performed for each of the shooting elements 1a-1d.

In step S210k of the process for one of the shooting elements, the ECU 4 obtains the detection result signal of the shooting element 1a-1d output from the upper side contact position sensor 12 and the lower side contact position sensor 13. Thus, the current attachment status data T1 of the camera 21 of the one of the shooting elements is obtained at this moment.

In step S220, the ECU 4 compares the current attachment status data T1 with the initial attachment status data T0 stored in the flash memory 45. Here, the initial attachment status data T0 as a comparison data of the current attachment status data T1 has been obtained through the I/O port 41a-41d for the position sensors 12, 13, which is the same as the I/O port 41a-41d for the position sensors 12, 13 through which the current attachment status data T1 is obtained.

Then, the ECU 4 determines whether the current attachment status data T1 is changed from the initial attachment status data T0. When the current attachment status data T1 is changed from the initial attachment status data T0, the calibration process is executed so that the retrieved region information corresponding to the shooting element 1 is corrected. When the current attachment status data T1 is not changed from the initial attachment status data T0, the ECU 4 does not correct the retrieved region information.

Figure 12:
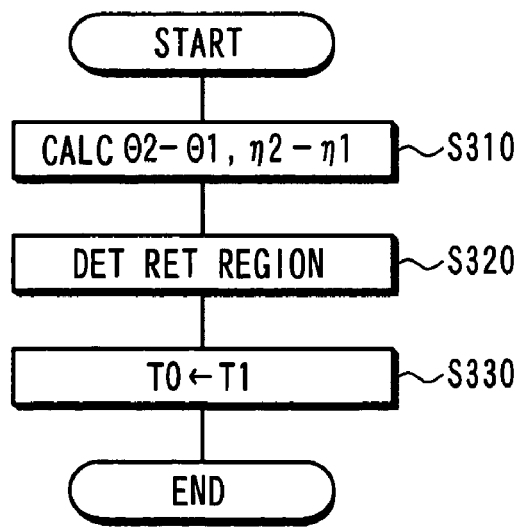
FIG. 12 is a flowchart showing a calibration modification process.

FIG. 12 shows the calibration modification process in step S230. In the calibration modification process, the ECU 4 calculates a shift angle $\Theta 2-\Theta 1$, $\eta 2-\eta 1$ of the camera 21 according to the current attachment status data T1 and the initial attachment status data T0 in step S310. Here, the camera 21 is a modification object of the calibration modification process in step S230 of FIG. 11. Then, in step S320, the retrieved region information is modified according to the shift angle $\Theta 2-\Theta 1$, $\eta 2-\eta 1$. Here, the retrieved region information as a modification object relates to the shot image obtained through the I/O port 40a-40d for the camera 21 corresponding to the I/O port 41a-41d for the position sensor 12, 13, through which the current attachment status data T1 is obtained. Here, the I/O port 40a-40d for the camera 21 is defined as a camera I/O port 40a-40d, and the I/O port 41a-41d for the position sensor 12, 13 is defined as a position sensor I/O port 41a-41d.

The camera I/O port 40a-40d and the corresponding position sensor I/O port 41a-41d are coupled with the camera 21 and the position sensor 12, 13, which belong to the same shooting element 1. For example, the camera I/O port 40b corresponds to the position sensor I/O port 41b.

In step S330, the current attachment status data T1 is stored as the initial attachment status data T0 corresponding to the position sensor I/O port 41a-41d in the flash memory 45. Thus, the initial attachment status data T0 corresponding to the position sensor I/O port 41a-41d is replaced with the current attachment status data T1. After step S330, the calibration modification process ends.

The shift angle calculated in step S310 will be explained. The position of the camera 21 may be changed with respect to the bracket 10 when an old shooting element 1 is replaced with a new shooting element 1, the position of the camera 21 is shifted although the shooting element 1 is mounted on the vehicle, or the like.

In the present embodiment, the shift angle is detected assuming that the shift of the angle of the camera 21 with respect to the bracket 10 occurs only two cases shown in FIGS. 13A to 14B, and the position and the orientation of the bracket 10 with respect to the vehicle are not changed.

Figure 13A:
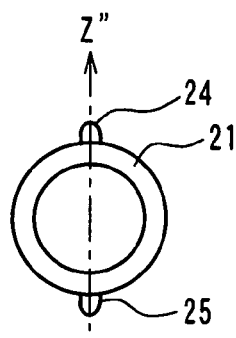
FIGS. 13A and 13B are diagrams showing an angle θ before a camera in the system shifts and after the camera shifts.
Figure 13B:
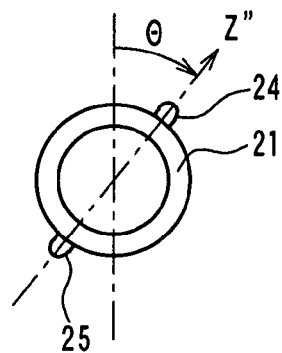

When the camera 21 is shifted from a state shown in FIG. 13A to a state shown in FIG. 13B, the shift of the angle relates to the shift of a rotation angle $\Theta$ around the Y"-axis of the camera 21. A direction to set the rotation angle $\Theta$ to be zero is a direction (i.e., the Z"-axial direction) from the lower side protrusion 25 to the upper side protrusion 24 when the camera 21 is directed to the proper direction accurately.

Figure 14A:
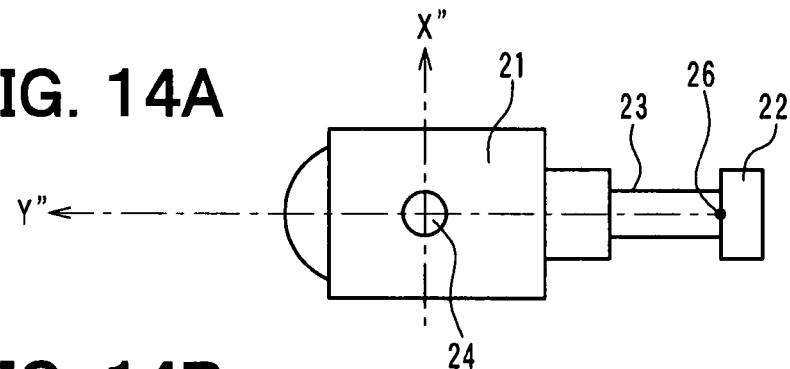
FIGS. 14A and 14B are diagrams showing an angle η before the camera in the system shifts and after the camera shifts.
Figure 14B:
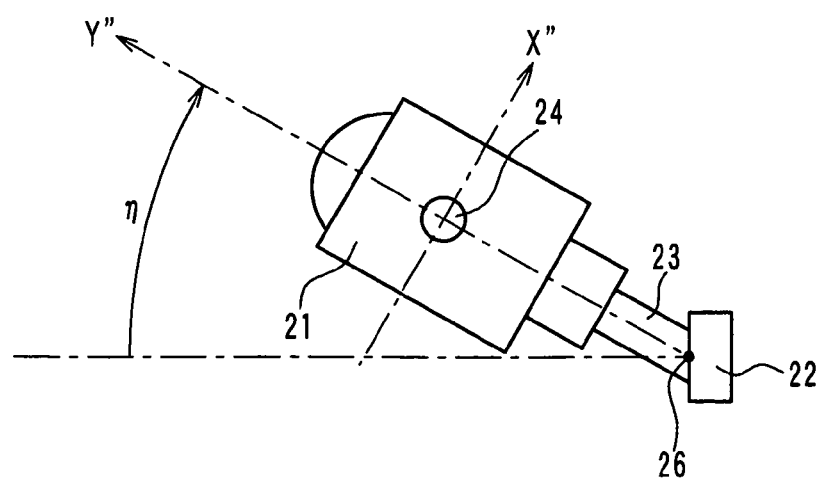

When the camera 21 is shifted from a state shown in FIG. 14A to a state shown in FIG. 14B, the shift of the angle relates to the shift of an angle $\eta$ around the fixation point 26. Specifically, the shift of the angle $\eta$ relates to the rotation of the camera 21 on the plane in parallel to the upper side contact position sensor 12 and the lower side contact position sensor 13. In the present embodiment, the direction from the lower side protrusion 25 to the upper side protrusion 24 is substantially perpendicular to the upper side contact position sensor 12 and the lower side contact position sensor 13. Thus, the plane in parallel to the upper side contact position sensor 12 and the lower side contact position sensor 13 is substantially in parallel to the X"-Y" plane. The angle $\eta$ is an angle of the Y"-axial direction with respect to the fixation point 26. A direction to set the angle $\eta$ to be zero is the Y"-axial direction when the camera 21 is directed to the predetermined direction accurately.

When the attachment status of the camera 21 is changed, it is considered that both of or one of the rotation angle $\Theta$ and the angle $\eta$ are shifted, and other shift does not occur. This consideration is proper because the camera side connector 22 mounted on one side of the connection cable 23 extending from the camera 21 is fixed to the bracket side connector 11, and the bracket side connector 11 is fixed to the bracket 10, so that the camera 21 is restricted from displacement. Here, it is considered that the shift of the angle $\eta$ is sufficiently smaller than 1 radian. This estimation provides to simplify calculation in the calibration modification process.

The shift of the rotation angle $\Theta$ is an example of a change amount of the orientation of the camera 21 with respect to the vehicle, the camera 21 being connected to the same camera I/O port 40a-40d or being different from the original camera 21 when the original camera 21 is replaced to another camera. The shift of the angle η is an example of a change amount of the position and the orientation of the camera 21 with respect to the vehicle, the camera 21 being connected to the same camera I/O port 40a-40d.

Figure 15:
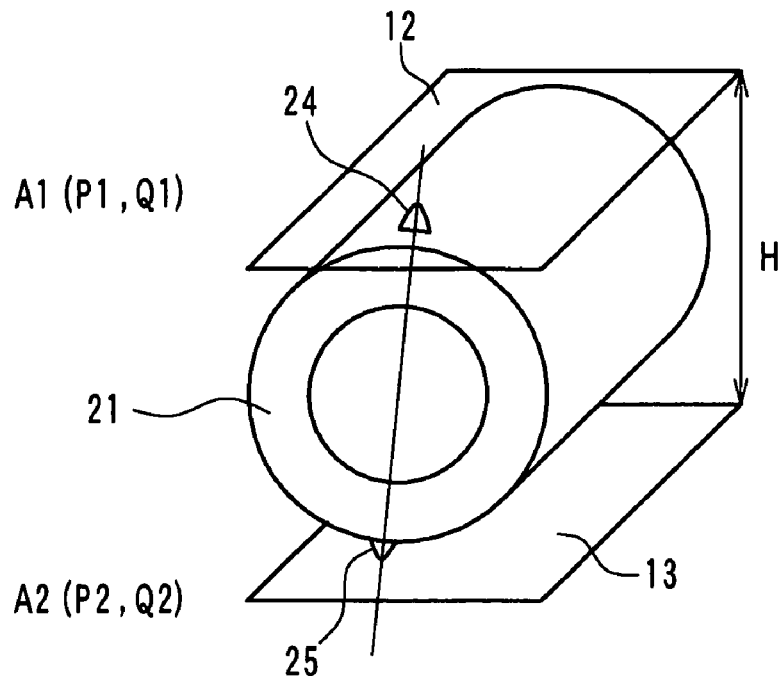
FIG. 15 is a diagram showing a tilt of a camera body before the camera shifts.
Figure 16:
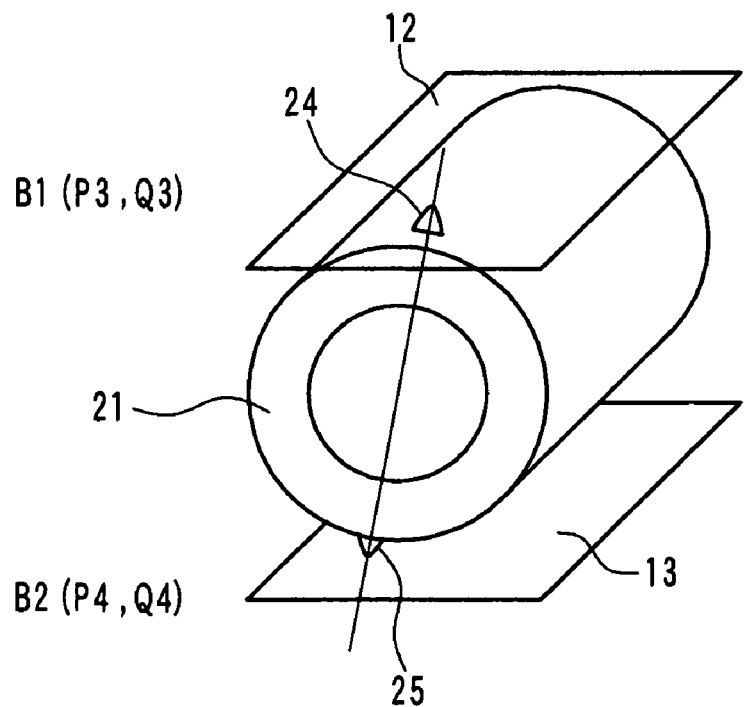
FIG. 16 is a diagram showing a tilt of the camera body after the camera shifts.

A method for calculating the shift of the rotation angle Θ according to the initial value T0 of the attachment status and current attachment status data T1 be explained with reference to FIGS. 15 to 17. As shown in FIG. 15, the coordinates A1 (P1, Q1) of the contact position of the upper side protrusion 24 and the coordinates A2 (P2, Q2) of the contact position of the lower side protrusion 25 are obtained from the initial value T0 as an initial attachment status data. As shown in FIG. 16, the coordinates B1 (P3, Q3) of the contact position of the upper side protrusion 24 and the coordinates B2 (P4, Q4) of the contact position of the lower side protrusion 25 are obtained from the current attachment status data T1.

Figure 17A:
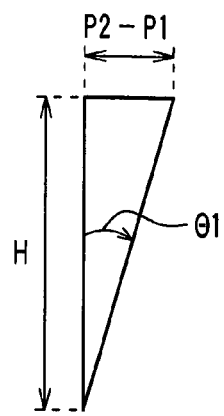
FIGS. 17A and 17B are diagrams showing tilt angles θ1, θ2 of the camera body before and after the camera shifts.

Then, the rotation angle Θ1 of the camera 21 before the camera 21 shifts is calculated based on the P-coordinate P1 of the extracted contact position of the upper side protrusion 24 and the P-coordinate P2 of the extracted contact position of the lower side protrusion 25 according to an equation of Θ$1=\tan^{-1}((P2-P1)/H)$, as shown in FIG. 17A. Here, H represents a height between the upper side contact position sensor 12 and the lower side contact position sensor 13.

Figure 17B:
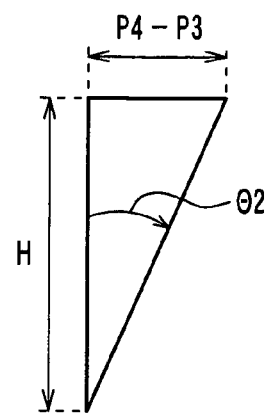

Then, the rotation angle Θ2 of the camera 21 after the camera 21 shifts is calculated based on the P-coordinate P3 of the extracted contact position of the upper side protrusion 24 and the P-coordinate P4 of the extracted contact position of the lower side protrusion 25 according to an equation of Θ$2=\tan^{-1}((P4-P3)/H)$, as shown in FIG. 17B. Thus, the shift of the rotation angle Θ is calculated as (Θ2−Θ1). Here, the rotation angle Θ provides a first angle.

Figure 18A:
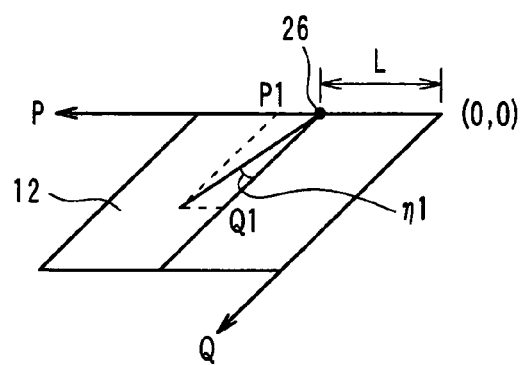
FIGS. 18A and 18B are diagrams showing tilt angles η1, η2 of the camera body before and after the camera shifts.
Figure 18B:
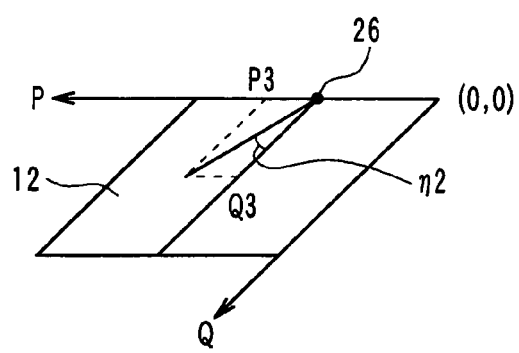

Then, a method for calculating the shift of the angle η according to the initial value T0 of the attachment status and current attachment status data T1 will be explained with reference to FIG. 18. The angle η provides a second angle. As shown in FIG. 18A, the coordinates A1 (P1, Q1) of the contact position of the upper side protrusion 24 is obtained from the initial attachment status data T0. As shown in FIG. 18B, the coordinates B1 (P3, Q3) of the contact position of the upper side protrusion 24 is obtained from the current attachment status data T1.

Then, the angle η1 of the camera 21 before the camera 21 shifts is calculated based on the P-coordinate P1 and the Q-coordinate Q1 of the extracted contact position of the upper side protrusion 24 according to an equation of η$1=\tan^{-1}((P1-L)/Q1)$, as shown in FIG. 18A. Further, the angle η2 of the camera 21 after the camera 21 shifts is calculated based on the P-coordinate P3 and the Q-coordinate Q3 of the extracted contact position of the upper side protrusion 24 according to an equation of η$2=\tan^{-1}((P3-L)/Q3)$, as shown in FIG. 18B. Thus, the shift of the angle η is calculated as (η2−η1).

Thus, in step S310, the shift (Θ2−Θ1) of the rotation angle Θ and the shift (Θ2−Θ1) of the angle are calculated.

Next, in step S320, the modification of the retrieved region information with using the shift (Θ2−Θ1) of the rotation angle Θ and the shift (η2−η1) of the angle η will be explained. The modification of the retrieved region information includes a step of modification based on the shift (Θ2−Θ1) of the rotation angle Θ and a step of modification based on the shift (η2−η1) of the angle η after the step of modification based on the shift (Θ2−Θ1) of the rotation angle Θ. Alternatively, the step of modification based on the shift (η2−η1) of the angle η may be performed, and then, the step of modification based on the shift (Θ2−Θ1) of the rotation angle Θ is performed.

Figure 19:
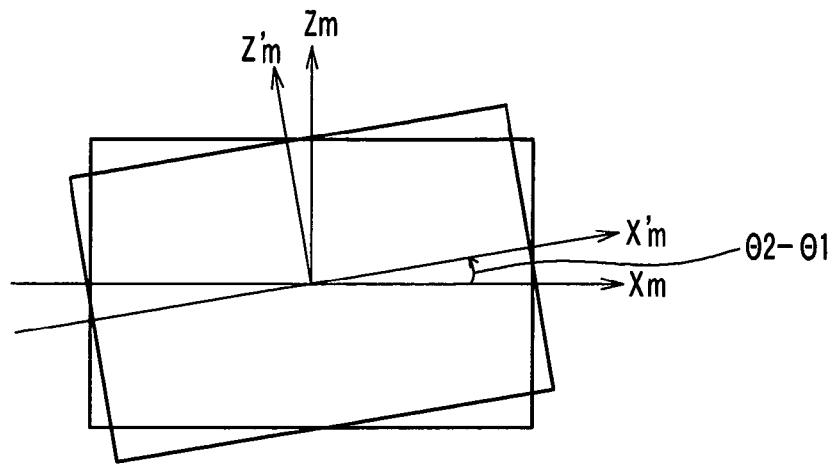
FIG. 19 is a diagram showing display coordinate system of the angle θ before and after the camera shifts.

The step of modification based on the shift (Θ2−Θ1) of the rotation angle Θ will be explained. The shift (Θ2−Θ1) of the rotation angle Θ relates to a shift of the rotation angle around the Y"-axis. Thus, as shown in FIG. 19, the display coordinate system together with the camera 21 rotates and shifts by the angle (Θ2−Θ1) around the original point with respect to the local coordinate system. The X'm-axis and the Z'm-axis in FIG. 19 represents the Xm-axis and the Zm-axis of the display coordinate system after the camera 21 shifts.

The retrieved region in the local coordinate system based on the stored retrieved region information rotates and shifts by the angle (Θ2−Θ1) from the proper retrieved region. Thus, the retrieved region in the display coordinate system provided by the retrieved region information is rotated reversely by the angle (Θ2−Θ1) so that the image of the retrieved region in the local coordinate system, which is retrieved from the original shot image, is not changed from the proper image even when the retrieved region rotates and shifts.

Specifically, the display coordinates (X'm, Z'm) in the retrieved region information are substituted into the right side of the equation F3.

$$\begin{bmatrix} XmA \\ ZmA \end{bmatrix} = \begin{bmatrix} \cos(\Theta 2 - \Theta 1) & \sin(\Theta 2 - \Theta 1) \\ -\sin(\Theta 2 - \Theta 1) & \cos(\Theta 2 - \Theta 1) \end{bmatrix} \begin{bmatrix} Xm \\ Zm \end{bmatrix} \qquad F3$$

Thus, the display coordinates (X'm, Z'm) are converted to the new display coordinates (XmA, ZmA). Thus, the new display coordinates (XmA, ZmA) is used for the retrieved region information so that the new retrieved region information is obtained. The conversion matrix in the equation F3 is an example of the modification amount to modify the retrieved region information.

Next, the step of modification based on the shift (η2−η1) of the angle η will be explained. The shift (η2−η1) is a shift of the rotation angle η of the camera 21 around the fixation point 26 as a rotation center. Thus, the camera coordinate system and the display coordinate system shift and rotate by the angle (η2−η1) around the fixation point 26 with respect to the local coordinate system, as shown in FIG. 20.

Figure 20:
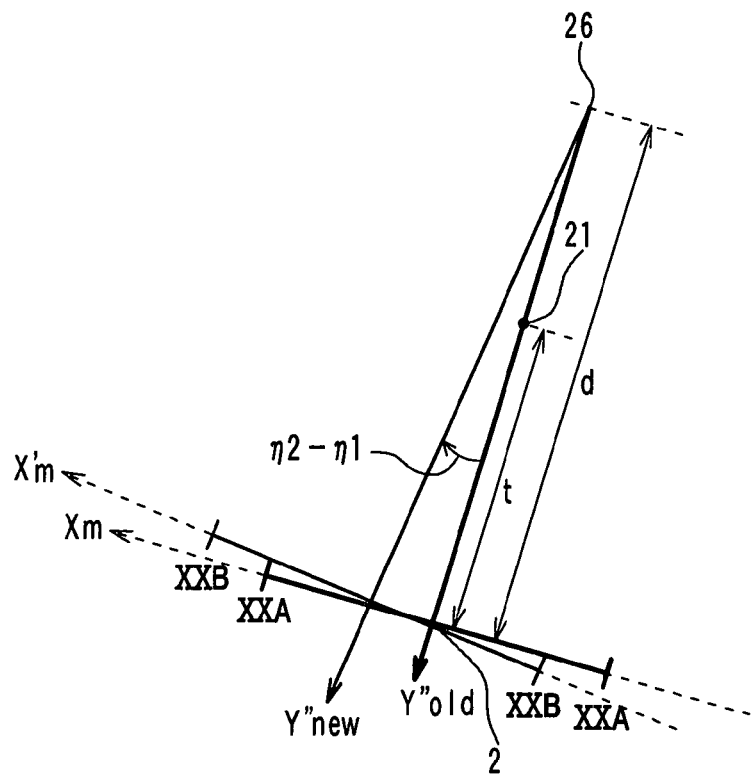
FIG. 20 is a diagram showing display coordinate system and camera coordinate system of the angle η before and after the camera shifts.

In FIG. 20, the Y"-axis of the camera coordinate system before the camera 21 rotates and shifts is shown as Y"old-axis, and the Y"-axis of the camera coordinate system after the camera 21 rotates and shifts is shown as Y"new-axis. FIG. 20 shows the Y"old-axis, the Y"new-axis, the Xm-axis of the display coordinate system before the camera 21 rotates and shifts, and the X'm-axis of the display coordinate system after the camera 21 rotates and shifts, which are viewed in a direction from a positive side of the Z"-axis to a negative side of the Z"-axis.

According to the rotation shown in FIG. 20, the retrieved region in the local coordinate system based on the stored retrieved region information rotates by the angle (η2−η1) so that the proper region XXA-XXA is shifted to the shifted region XXB-XXB. Thus, the retrieved region information is modified in two steps so that the image of the retrieved region in the local coordinate system, which is retrieved from the original shot image, is not changed from the proper image even when the retrieved region rotates and shifts.

Figure 21:
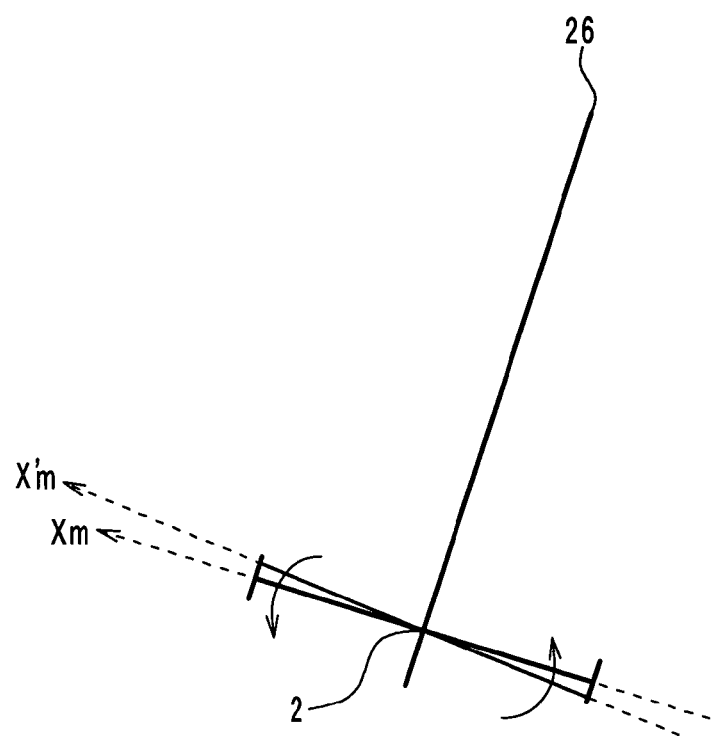
FIG. 21 is a diagram showing a retrieved range after a shift in a X" direction is corrected.

In the first step, as shown in FIG. 21, the retrieved region in the display coordinate system provided by the retrieved region information is translated without rotating by the shift amount S=d×tan (η29−η1) in the negative direction of the X'm-axis so that the retrieved region in the local coordinate system is returned to the region XXA-XXA. Specifically, the shift amount S is subtracted from the Xm coordinate of the display coordinate system in the retrieved region information so that the new X'm coordinate of the display coordinate system is obtained. Here, the distance d is a distance between the fixation point 26 and the visual point 2. The shift amount d×tan ($\eta 2-\eta 1$) is an example of the modification amount to modify the retrieved region information.

Figure 22:
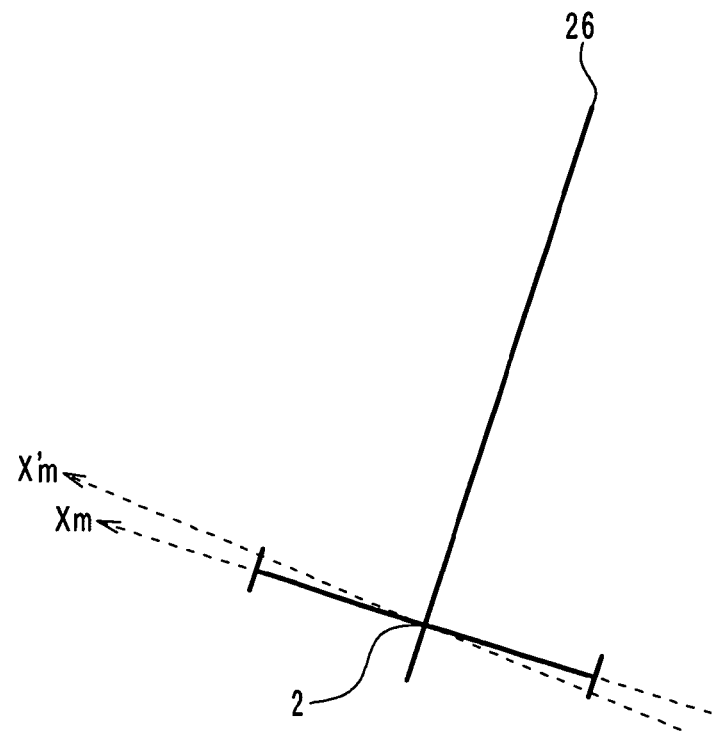
FIG. 22 is a diagram showing the retrieved range after a shift of a rotation direction is corrected.

Then, in the second step, as shown in FIGS. 21 and 22, the retrieved region in the display coordinate system is changed so that the modified retrieved region in the first step in the local coordinate system is reversely rotated by the angle ($\eta 2-\eta 1$) around the visual point 2 on the Xm-Zm plane.

Specifically, the display coordinates are converted by a coordinate conversion method provided by the equation F4, which is prepared for the camera coordinates.

$$\begin{bmatrix} X''A \\ Y''A - t \\ Z''A \end{bmatrix} = \begin{bmatrix} \cos(\eta 2 - \eta 1) & \sin(\eta 2 - \eta 1) & 0 \\ -\sin(\eta 2 - \eta 1) & \cos(\eta 2 - \eta 1) & 0 \\ 0 & 0 & 1 \end{bmatrix} \begin{bmatrix} X'' \\ Y'' - t \\ Z'' \end{bmatrix} \quad F4$$

Here, t represents a distance between the original point of the camera coordinate system (i.e., the gravity center of the camera 21) and the visual point 2.

Specifically, the display coordinates in the retrieved region information modified in the first step are defined by (XmB, ZmB). The modified display coordinates (XmB, ZmB) are substituted to the display coordinates (Xm, Zm) in the left side of the equation F2 so that the camera coordinates (X", Z") are calculated. Here, in the equation F2, the Y" coordinate is equal to t.

Thus, the obtained camera coordinates (X", Y", Z") are substituted to the right side of the equation F4 so that the display coordinates (VA, Y"A, Z"A) are obtained. Then, the obtained display coordinates (X"A, Y"A, Z"A) are substituted to the camera coordinates (X", Y", Z") in the right side of the equation F2 so that the converted display coordinates (X"m, Z"m) are obtained.

Thus, the display coordinates (XmB, ZmB) in the retrieved region information modified in the first step are modified in the second step so that the converted display coordinates (X"m, Z"m) in the retrieved region information are obtained. Here, the conversion matrix in the equation F4 is an example of the modification amount to modify the retrieved region information.

The modification in the first step may be performed after the modification in the second step. Specifically, firstly the second step is performed, and then, the first step is performed.

Thus, each time the vehicle starts, and the power source of the display system turns on, the shift ($\eta 2-\eta 1$) of the angle $\eta$ and the shift ($\Theta 2-\Theta 1$) of the rotation angle $\Theta$ in the camera 21 are calculated according to the status change between the previous attachment status of the camera 21 when the system turned on previously and the current attachment status of the camera 21, and further, based on the calculation result of the shift ($\eta 2-\eta 1$) of the angle $\eta$ and the shift ($\Theta 2-\Theta 1$) of the rotation angle $\Theta$, the retrieved region information is modified so that the predetermined region in the local coordinate system is retrieved from the original shot image, and the image of the retrieved region is displayed on the display device 3.

Just after the process in FIG. 11 ends, the bird eye view image display process starts. Thus, the bird eye view image prepared by the modified retrieved region information is displayed on the display device 3.

Each time the display system turns on, the ECU 4 modifies the retrieved region of each shot image obtained from the camera I/O ports 40a-40d. When the retrieved region is modified, the ECU 4 uses the contact positions of the protrusions 24, 25 fixed to the camera 21, which is coupled with the camera I/O port 40a-40d. Specifically, the ECU 4 uses the information about the contact positions before the camera 21 shifts and after the camera 21 shifts.

Accordingly, even if the position and/or the orientation of the camera 21 with respect to the bracket 10 shift when the shooting element 1a-1d is replace to a new one, or even if the position and/or the orientation of the camera 21 with respect to the bracket 10 shift since an external force is applied to the camera 21, the retrieved region in the display coordinate system is modified according to the shift of the camera 21. Thus, the predetermined region in the local coordinate system is displayed on the display screen of the display device 3.

For example, when the shooting element 1c is replaced to a new one having the same function of the shooting element 1c in a period between previous turn-on time and current turn-on time of the system, the ECU 4 modifies the retrieved region information obtained from the camera I/O port 40c with using the initial attachment status data T0 and the current attachment status data T1. The initial attachment status data T0 is obtained from the position sensor I/O port 41c before the camera 21 is replaced, and the current attachment status data T1 is obtained from the same position sensor I/O port 41c after the camera 21 is replaced.

Further, since the modification of the retrieved region information is automatically performed each time the system turns on, the user of the vehicle does not perform an additional operation for modification. Thus, the retrieved region in the display coordinate system is modified automatically and quickly.

The modification amount in the retrieved region information is calculated based on the change amount of the position and/or the orientation of the camera 21 with respect to the vehicle. The retrieved region information is modified with using the modification amount. Thus, difference between the current retrieved region information and the previous retrieved region information is used for modification. Thus, since the previous retrieved region information is used, the modification accuracy is improved, and the modification process is simplified, compared with a case where the new retrieved region information is calculated without using the previous retrieved information.

Other Embodiments

In the above embodiment, the contact position sensors 12, 13 are arranged on the upper portion and the lower portion of the camera 21, respectively. However, the sensor 12, 13 may be arranged on another portion of the camera 21. Further, the number of the sensors 12, 13 may be one or more than two. For example, four contact position sensors may be arranged on the upper, lower, right and left portions of the camera 21, respectively. In this case, when the camera 21 may include four protrusions, each of which contacts a corresponding sensor, the orientation and position of the camera 21 are detected with high accuracy. When the camera 21 has a columnar shape; the system may include one contact position sensor 1 having a cylindrical shape for surrounding a sidewall of the columnar shape of the camera 21.

The camera 21 may be directly coupled with the cable 14 without passing through the camera side connector 22 and the bracket side connector 11. In this case, the ECU 4 performs modification calculation by replacing the fixation point 26 with a fixed portion of the camera unit 20 with respect to the bracket 10. The camera unit 20 is fixed with the bracket 10 at the fixed portion such as a lock portion of the camera unit 20.

In the above embodiment, the initial retrieved region information and the initial attachment status data are overwritten with the retrieved region information and the attachment status data, which are obtained as the calibration result. In this case, in the calibration modification process, based on the current attachment status data and the previous attachment status data, the retrieved region information is modified from the previous retrieved region information. Alternatively, the current retrieved region information and the current attachment status data may be stored as other data, and therefore, the initial retrieved region information and the initial attachment status data are also stored. In this case, in the calibration modification process, based on the current attachment status data and the initial attachment status data, the retrieved region information may be modified from the initial retrieved region information so that the current retrieved region information is calculated. Here, the initial retrieved region information and the initial attachment status data are obtained when the vehicle is shipped.

In the above embodiment, when the vehicle is shipped, i.e., when the display system is activated for the first time, the calibration process is automatically executed. However, it is not necessary to execute the calibration process automatically when the vehicle is shipped. For example, it is not necessary to perform the calibration process when positioning accuracy of the shooting element 1 and the camera 21 is sufficiently high.

In the bird eye view image process, the retrieved region image is converted to the bird eye view image according to not only the depression angle ϕ1 but also the attachment angles η2, Θ2.

The ECU 4 detects the positional shift of the camera 21 with respect to the bracket 10. Further, the ECU 4 may detect the positional shift of the bracket 10 with respect to the vehicle. Based on the positional shifts, the ECU 4 may modify the retrieved region information.

In the above embodiment, the marker objects 31-34 are arranged at four corners of the outer periphery of the retrieved regions 6a-6d. Alternatively, more than four marker objects or less than four marker objects may be arranged in the retrieved regions 6a-6d. Alternatively, the marker objects 31-34 may be arranged on an outside of the retrieved regions 6a-6d.

Figure 9:
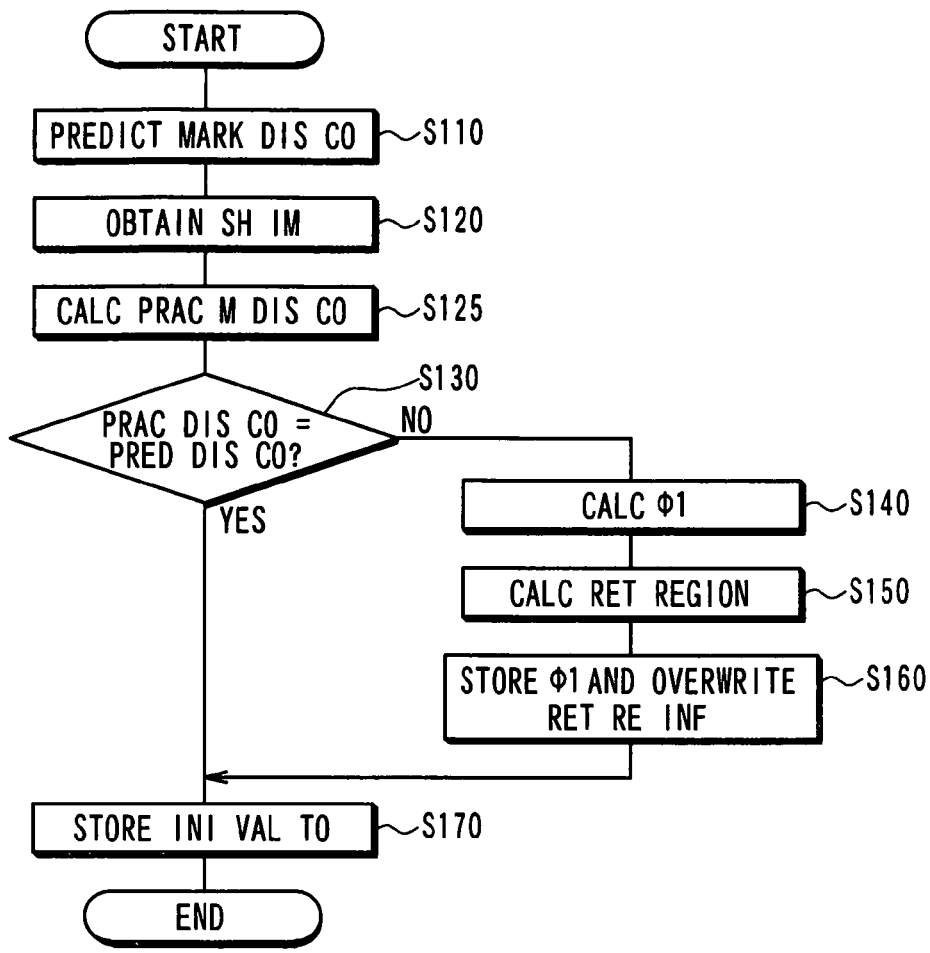
FIG. 9 is a flowchart showing a calibration process.

In the step S140 of the calibration process shown in FIG. 9, the depression angle ϕ0 of the camera 21 may be gradually changed until the practical display coordinates coincides with the predicted display coordinates. The predicted display coordinates are recalculated with using the depression angle ϕ0. When the practical display coordinates coincides with the predicted display coordinates, the depression angle ϕ0 is specified as the actual depression angle ϕ1.

The shooting elements 1a-1d may receive a signal from and transmit a signal to the ECU 4 via an in-vehicle LAN. In this case, the ECU 4 and the in-vehicle LAN provide a controller. A port of the shooting element 1, which is coupled with the in-vehicle LAN, provides a camera I/O port and a position sensor I/O port.

The ECU 4 converts the shot image to the bird eye view image when the retrieved region image from the original shot image is displayed on the display device 3. Then, the ECU 3 controls the display device 3 to display the converted bird eye view image. Alternatively, the ECU 4 may control the display device 3 to display the retrieved region image from the original without converting the retrieved region image into the bird eye view image.

In the above embodiment, each process is executed by a program of the ECU 4. Alternatively, each process may be provided by a calculation device having a special circuit. For example, each process may be provided by a FPGA (i.e., field programmable gate array), which is capable of programming a special circuit.

The above disclosure has the following aspects.

According to an aspect of the present disclosure, an display system for shooting and displaying an image around a vehicle includes: a shooting element mounted on the vehicle; a controller including a camera port, a position sensor port, a processor and a memory; and a display device. The shooting element includes a bracket, a camera, a protrusion and a contact position sensor. The bracket is fixed to the vehicle. The camera is accommodated in the bracket, and shoots an image around the vehicle. The protrusion is mounted on the camera. The contact position sensor mounted on the bracket, and detects a contact position of the protrusion. The camera includes an output terminal for outputting an image signal. The output terminal of the camera is coupled with the camera port via a cable. The contact position sensor includes an output terminal for outputting a detection result signal. The output terminal of the contact position sensor is coupled with the position sensor port via a cable. The memory stores retrieved region information, which is defined by a display coordinate system, and provides information of a retrieved region, which is retrieved from the image. The display coordinate system is fixed to the image. The processor retrieves the retrieved region defined by the display coordinate system from the image according to the retrieved region information. The processor controls the display device to display the retrieved region. When the contact position of the protrusion is changed, the processor modifies the retrieved region information based on the contact position before changing and the contact position after changing in such a manner that a region defined by a local coordinate system corresponding to the retrieved region defined by the display coordinate system after changing is equal to the region defined by the local coordinate system before changing. The local coordinate system is fixed to the vehicle.

In the above system, the processor modifies the retrieved region of the image with using the contact position of the protrusion before the camera shifts and the contact position of the protrusion after the camera shifts. Accordingly, even if a position and/or a orientation of the camera with respect to the bracket are changed after the shooting element is replaced with a new one, or even if the position and/or the orientation of the camera with respect to the bracket are changed when external force is applied to the shooting element, the system modifies the retrieved region defined in the display coordinate system according to the change of the position and/or the orientation of the camera. It is not necessary to place the vehicle with the system in special environment for modifying the retrieved region.

Alternatively, the processor may determine whether the contact position, of the protrusion is changed when the display system turns on. The processor modifies the retrieved region information when the contact position of the protrusion is changed. In this case, it is not necessary for a user to perform a special operation. The system modifies the retrieved region automatically and rapidly.

Alternatively, the processor may calculate a change amount of a position and an orientation of the camera with respect to the vehicle according to the contact position before changing and the contact position after changing when the processor modifies the retrieved region information. The processor calculates a modification amount for modifying the retrieved region information based on the change amount of the position and the orientation of the camera. The processor modifies the retrieved region information according to the modification amount. Thus, difference between the current retrieved region information and the previous retrieved region information is used for modification. Thus, since the previous retrieved region information is used, the modification accuracy is improved, and the modification process is simplified, compared with a case where the new retrieved region information is calculated without using the previous retrieved information.

Further, the contact position sensor may include a first contact position sensor and a second contact position sensor, which faces the first contact position sensor through the camera. The protrusion includes a first protrusion and a second protrusion, each of which protrudes from the camera in such a manner that a protruding direction of the first protrusion is opposite to a protruding direction of the second protrusion. The first protrusion contacts the first contact position sensor, and the second protrusion contacts the second contact position sensor. The shooting element further includes a bracket connector, a connection cable and a camera connector. The bracket connector is fixed to the bracket. The camera is coupled with the camera connector via the connection cable. The camera connector is coupled with the bracket connector. The processor calculates a shift of a first angle and a shift of a second angle based on a first contact position of the first protrusion detected by the first contact position sensor and a second contact position of the second protrusion detected by the second contact position sensor before changing and after changing. The processor calculates the modification amount based on the shift of the first angle and the shift of the second angle. The first angle is a rotation angle around an optical axis of the camera. The second angle is an angle around a fixation point as a center for showing a direction of the optical axis of the camera. The fixation point is a connection point between the camera connector and the connection cable. The second angle is defined on a plane perpendicular to a line between the first contact position sensor and the second contact position sensor. This consideration is proper because the camera connector mounted on one side of the connection cable extending from the camera is fixed to the bracket connector, and the bracket connector is fixed to the bracket, so that the camera is restricted from displacement. This provides to simplify calculation in the modification process.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A display system for shooting and displaying an image around a vehicle comprising:
    a shooting element mounted on the vehicle; and
    a controller mounted on the vehicle and including a camera port, a position sensor port, a processor and a memory,
    wherein the shooting element includes a bracket fixed to the vehicle, a camera for shooting the image around the vehicle and accommodated in the bracket, a protrusion fixed to the camera, and a contact position sensor fixed to the bracket and detecting a contact position of the protrusion,
    wherein the camera includes an output terminal for outputting a shooting image around the vehicle, which is coupled with the camera port via a cable,
    wherein the contact position sensor includes an output terminal for outputting a detection result signal, which is coupled with the position sensor port via another cable,
    wherein the memory stores retrieved region information, which is defined by a display coordinate system, and provides information of a retrieved region, which is retrieved from the shooting image, the display coordinate system being fixed to the image,
    wherein the processor retrieves the retrieved region defined by the display coordinate system from the shooting image according to the retrieved region information, the shooting image being obtained from the camera port, and further, the processor controls the display device to display the retrieved region, and
    wherein, when the contact position of the protrusion obtained via the position sensor port is changed, the processor modifies the retrieved region information based on the contact position before changing and the contact position after changing in such a manner that a region defined by a local coordinate system corresponding to the retrieved region of the shooting image obtained via the camera port after changing is equal to the region defined by the local coordinate system before changing, the local coordinate system being fixed to the vehicle.

2. The display system for shooting and displaying the image around the vehicle according to claim 1,
    wherein the processor determines, whether the contact position of the protrusion obtained via the position sensor port is changed, at each time the display system for shooting and displaying the image around the vehicle turns on, and
    wherein the processor modifies the retrieved region information when the contact position of the protrusion is changed.

3. The display system for shooting and displaying the image around the vehicle according to claim 1,
    wherein the processor calculates a change amount of a position and an orientation of the camera with respect to the vehicle according to the contact position before changing and the contact position after changing when the processor modifies the retrieved region information,
    wherein the processor calculates a modification amount for modifying the retrieved region information based on the change amount of the position and the orientation of the camera, and
    wherein the processor modifies the retrieved region information according to the modification amount.

4. The display system for shooting and displaying the image around the vehicle according to claim 3,
    wherein the contact position sensor includes a first contact position sensor and a second contact position sensor, which faces in parallel to the first contact position sensor,
    wherein the protrusion includes a first protrusion and a second protrusion, the first protrusion protruding from the camera and contacting the first contact position sensor, and the second protrusion protruding from the camera in a direction opposite to the first protrusion and contacting the second contact position sensor;
    wherein the bracket is fixed to a bracket connector, wherein a camera connector coupled with one end of a connection cable, which extends from the camera, is fixed to the bracket connector, wherein the processor calculates a shift of a first angle defined as $\Theta$ and a shift of a second angle defined as $\eta$ based on a first contact position of the first protrusion detected by the first contact position sensor and a second contact position of the second protrusion detected by the second contact position sensor before changing, the first and second contact positions being obtained via the position sensor port assuming that only the shift of the first angle defined as $\Theta$ and the shift of the second angle defined as $\eta$ are generated, wherein the processor calculates the modification amount based on the shift of the first angle defined as $\Theta$ before and after changing and the shift of the second angle defined as $\eta$ before and after changing, wherein the first angle defined as $\Theta$ is a rotation angle around an optical axis of the camera, and wherein the second angle defined as $\eta$ is an angle around a fixation point as a center for showing a direction of the optical axis of the camera with respect to the fixation point, the fixation point being a connection point between the camera connector and the connection cable, and the second angle being defined on a plane in parallel to the first contact position sensor and the second contact position sensor.

* * * * *